(12) United States Patent
Omote et al.

(10) Patent No.: US 8,747,600 B2
(45) Date of Patent: Jun. 10, 2014

(54) ENCLOSURE AND METHOD OF MANUFACTURING THE SAME

(71) Applicant: Fujitsu Limited, Kawasaki (JP)

(72) Inventors: Koji Omote, Isehara (JP); Koichi Kimura, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/887,465

(22) Filed: May 6, 2013

(65) Prior Publication Data

US 2013/0243983 A1 Sep. 19, 2013

Related U.S. Application Data

(63) Continuation of application No. PCT/JP2010/072362, filed on Dec. 13, 2010.

(51) Int. Cl.
*B29C 51/14* (2006.01)
*B27D 1/08* (2006.01)

(52) U.S. Cl.
USPC ........... 156/245; 156/211; 156/217; 156/224; 144/349; 144/381

(58) Field of Classification Search
USPC ................. 156/211, 217, 224, 242, 245, 258; 144/349, 381; 217/1, 2
See application file for complete search history.

(56) References Cited

U.S. PATENT DOCUMENTS

| 213,179 | A | * | 3/1879 | DeForest | 144/381 |
| 437,145 | A | * | 9/1890 | Craige | 312/284 |
| 2,312,333 | A | * | 3/1943 | Gramelspacher | 156/218 |
| 2,407,711 | A | * | 9/1946 | Luth | 156/211 |
| 5,728,246 | A | * | 3/1998 | Ewaschuk | 156/211 |
| 6,089,288 | A | * | 7/2000 | Crowe | 144/355 |

FOREIGN PATENT DOCUMENTS

| JP | S29-6047 | | 9/1954 |
| JP | S55-144109 | | 11/1980 |
| JP | S61-35904 | | 2/1986 |
| JP | 95035046 B2 | * | 4/1995 |
| JP | H10-31533 | | 2/1998 |
| JP | 2005-353748 A1 | | 12/2005 |
| JP | 2007253345 A | * | 10/2007 |

OTHER PUBLICATIONS

Machine translation of Japanese Patent Publication No. JP 95035046 B2, originally published Apr. 19, 1995, 3 pages.*
International Search Report for International Application No. PCT/JP2010/072362 dated Mar. 15, 2011.

* cited by examiner

*Primary Examiner* — William Bell
(74) *Attorney, Agent, or Firm* — Kratz, Quintos & Hanson, LLP

(57) ABSTRACT

A core layer is formed by bonding a plurality of wooden plates together by using an adhesive. The core layer is cut into a predetermined shape having notches. The core layer is placed on a die of a pressing machine by being positioned by using the notches and pins placed on the die. The core layer is press molded to firmly hold the pin by the outer edge of the notch and to harden the adhesive.

11 Claims, 19 Drawing Sheets

ENCLOSURE AND METHOD OF MANUFACTURING THE SAME

CROSS-REFERENCE TO RELATED APPLICATION

This application is a continuation of International Patent Application No. PCT/JP2010/072362 filed Dec. 13, 2010 and designated the U.S., the entire contents of which are incorporated herein by reference.

FIELD

The embodiments discussed herein are related to an enclosure using wood and a method of manufacturing the same.

BACKGROUND

An enclosure of an electronic device such as a notebook computer or a mobile phone is generally made of metal or plastic, while an enclosure with its surface having a woodgrain pattern printed thereon is sometimes used because many users like unique texture of wood. However, when a woodgrain pattern is simply printed, the texture of wood is not fully reproduced. Hence, there is proposed use of wood for an enclosure of an electronic device.
Patent Document 1: Japanese Laid-open Patent Publication No. 2005-353748
Patent Document 2: Japanese Laid-open Patent Publication No. 10-31533
However, it is difficult to manufacture an enclosure having curved surfaces with good accuracy while keeping the texture of wood.

SUMMARY

According to a technical aspect of the disclosure, a method of manufacturing an enclosure, the method includes: forming a core layer by bonding a plurality of wooden plates together by using an adhesive; cutting the core layer to have a shape having a notch; placing the core layer on a die of a pressing machine while positioning the core layer by using the notch and a pin placed on the die; and press molding the core layer to firmly hold the pin by an outer edge of the notch and to harden the adhesive.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

DESCRIPTION OF EMBODIMENTS

Hereinbelow, before describing the embodiments, a description is given of a prelude for easy understanding of embodiments.

A conceivable method of manufacturing a wooden enclosure is three-dimensional processing by hollowing a thick plate. However, this method leads to a lot of waste materials and has a strength problem. Hence, use of plywood is conceivable for manufacturing the enclosure.

The use of plywood may make it possible to use: aesthetically pleasing wood without a joint or a worm-bore for a surface of the enclosure; and reasonable and highly processable wood for the inside thereof. In addition, stacking a plurality of thin plates may make it possible to ensure sufficient strength.

For manufacturing an enclosure having curved surfaces by using the plywood, the following method is conceivable. Specifically, the plywood is made flexible by being exposed to high-temperature steam, and then is press molded by using a mold having a certain shape. However, manufacturing an enclosure of a notebook computer or a mobile phone often uses sharp bending or deep drawing, and thus the aforementioned method might cause a crack or a crease in a bent portion. Moreover, when an unnecessary portion is cut down after the press molding, chipping is likely to occur, and thus the yield is lowered.

Further, for fixing a component such as a wiring board, fixing members such as bosses and spacers are attached to the enclosure of the electronic device. Although use of an adhesive is conceivable for attaching the fixing members to the enclosure, this case has steps of applying the adhesive, positioning the fixing members, hardening the adhesive, and the like, thus having a problem of increasing the number of steps. Although boring the enclosure and using screws or the like are also conceivable for fixing the fixing members, this case leads to exposure of the screws or the like from a surface of the enclosure, thus having a design problem.

From the above, there is a demand for a method of manufacturing an enclosure having high processing accuracy, an aesthetically pleasing appearance and favorable yield.

Hereinbelow, descriptions are given of the embodiments.

(First Embodiment)

FIGS. 1 to 15 are diagrams for explaining a method of manufacturing an enclosure according to a first embodiment.

Figure 1:
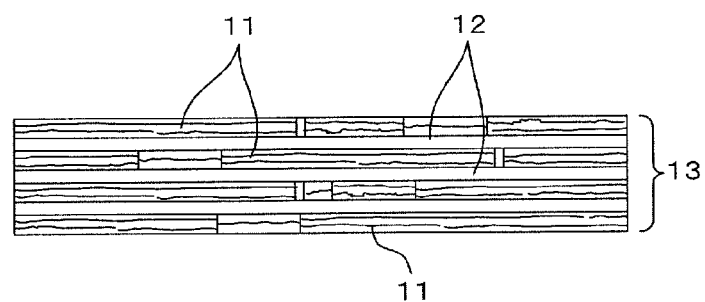
FIG. 1 is a diagram for explaining a method of manufacturing an enclosure according to a first embodiment (No. 1)

Firstly, as in a cross-sectional diagram of FIG. 1, a plurality of thin wooden plates 11 are bonded together with a thermosetting adhesive 12 to form a core layer 13. At this time, the thin plates 11 are bonded together by using adhesive force of the thermosetting adhesive 12 before hardening, and the thermosetting adhesive 12 is not hardened yet. The thin plates 11 are each set to have a thickness of approximately 0.5 mm to 1.0 mm, for example, and are preferably stacked on one another with the woodgrain patterns crossing each other layer by layer for ensuring the strength. In addition, the thin plates 11 are preferably made flame-retardant by being impregnated with a flame retardant in advance.

The thin plates 11 forming the core layer 13 are not desired to be aesthetically pleasing, and thus are allowed to have joints, worm-bores, and the like therein to some extent. In addition, since one layer may be formed by arranging the plurality of the thin plates 11 in a horizontal direction as illustrated in FIG. 1, thin plates formed from thinnings and thus having small widths may be used as the thin plates 11.

Figure 2:
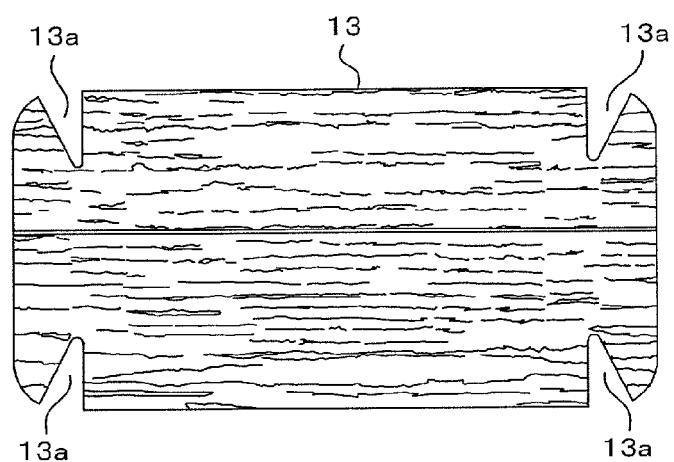
FIG. 2 is a diagram for explaining the method of manufacturing an enclosure according to the first embodiment (No. 2)

Next, as in a plan diagram of FIG. 2, the core layer 13 is cut into a predetermined shape. The cutting may be performed by punching or by using a band saw or the like. At this time, notches 13a are provided in portions to be largely bent in press molding to be described later. It is important that the notches 13a disappear by being closed at the time of the press molding. Portions for the notches 13a are determined in accordance with the shape to be obtained after the press molding.

Figure 3A:
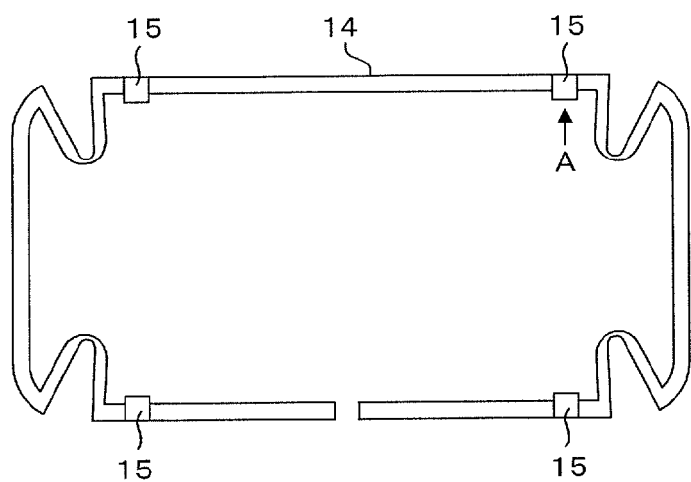
FIGS. 3A to 3C are diagrams for explaining the method of manufacturing an enclosure according to the first embodiment (No. 3)

Next, a frame 14 to be attached to end portions of the core layer 13 is prepared. FIG. 3A is a plan diagram of the frame 14, FIG. 3B is a side diagram of the frame 14, viewed in a direction illustrated by an arrow A in FIG. 3A, and FIG. 3C is a cross-sectional diagram taken along the I-I line of FIG. 3B.

Figure 3B:
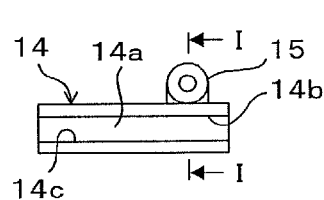
Figure 3C:
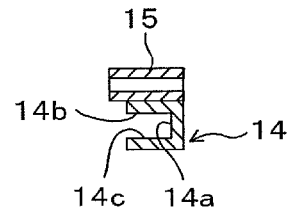

As illustrated in FIGS. 3B and 3C, the frame 14 includes: a first surface 14a facing end faces of the core layer 13; and a second surface 14b and a third surface 14c which sandwich the end portions of the core layer 13 on the front and back sides of the core layer 13. In addition, cylindrical bosses 15 are arranged on the frame 14 at predetermined positions where a central axis of each boss 15 is parallel to the second surface 14b and orthogonal to a direction in which the frame 14 extends.

The frame 14 is preferably made of a material having a higher strength than that of the core layer 13. In this embodiment, the frame 14 and the bosses 15 are integrally formed of a resin. The frame 14 and the bosses 15 may also be formed of a metal such as aluminum. Alternatively, the frame 14 and the bosses 15 may be formed separately, and then may be integrated into one by welding or the like.

Figure 4:
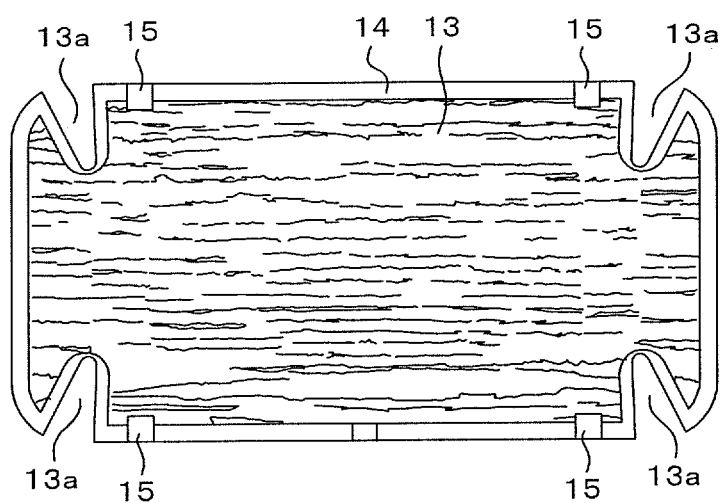
FIG. 4 is a diagram for explaining the method of manufacturing an enclosure according to the first embodiment (No. 4)

Next, as in FIG. 4, the frame 14 is attached to the end portions of the core layer 13 (including end portions of the notches 13a) in such a manner as to surround the core layer 13. Thereafter, in preprocessing of the press molding, the core layer 13 is made flexible by being exposed to steam for approximately 30 seconds, for example.

Figure 5A:
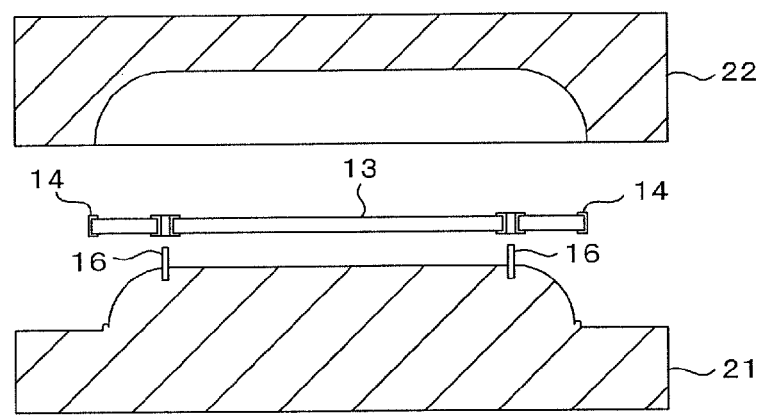
FIGS. 5A and 5B are diagrams for explaining the method of manufacturing an enclosure according to the first embodiment (No. 5)

Next, as in a cross-sectional diagram of FIG. 5A, the core layer 13 is placed on a lower die 21 of a pressing machine. In this case, holes are provided in advance in corner portions of the lower die 21 (portions where the core layer 13 are largely bent), and pins 16 serving as spacers are inserted into the holes. Then, as in a plan diagram of FIG. 5B, the core layer 13 is placed on the lower die 21 by using the pins 16 as guides. In other words, the core layer 13 is placed on the lower die 21 in such a manner that the pins 16 are located in the corner portions of the notches 13a of the core layer 13. This may make it possible to accurately position and place the core layer 13 on the lower die 21. Note that the pins 16 are preferably short enough not to protrude from the core layer 13. Reference numeral 22 in FIG. 5A denotes an upper die for press molding a core layer.

Figure 6:
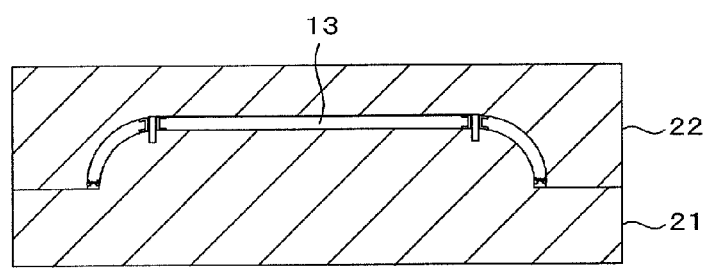
FIG. 6 is a diagram for explaining the method of manufacturing an enclosure according to the first embodiment (No. 6)
Figure 7A:
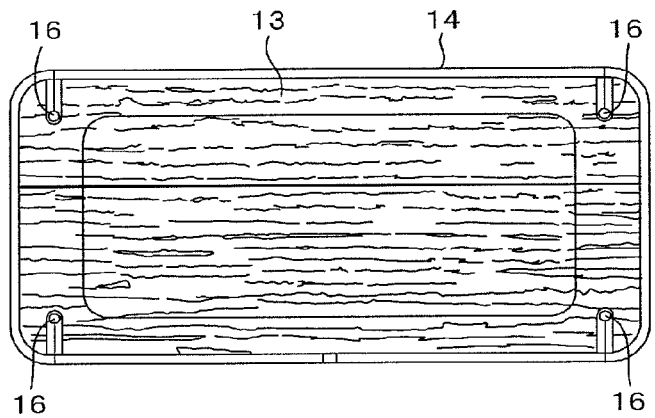
FIGS. 7A to 7C are diagrams for explaining the method of manufacturing an enclosure according to the first embodiment (No. 7)
Figure 7B:
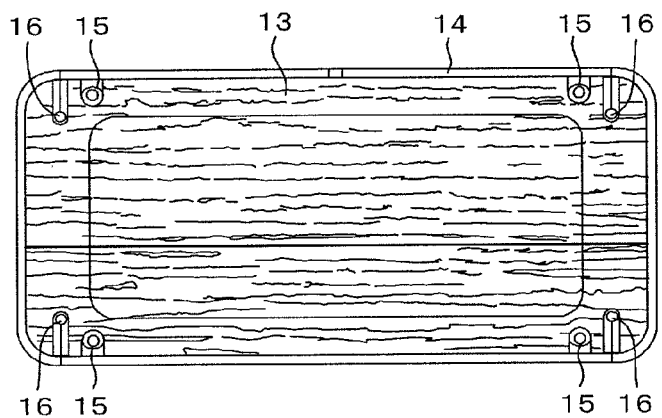
Figure 7C:
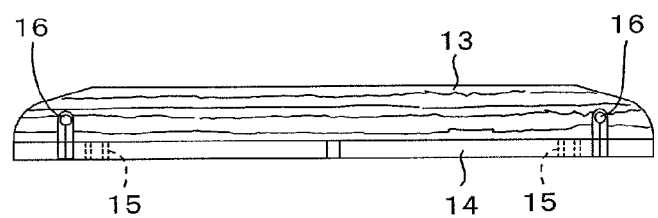

Next, as in FIG. 6, the upper die 22 is lowered, so that the lower die 21 and the upper die 22 sandwich the core layer 13. Then, a pressure and a heat are applied thereto to press mold (bend) the core layer 13 into a predetermined shape corresponding to the dies 21 and 22. This makes the core layer 13 have a three-dimensional shape as in FIGS. 7A to 7C. FIG. 7A is a top diagram of the core layer 13 (a press molded component) molded by the press molding, FIG. 7B is a bottom diagram thereof, and FIG. 7C is a side diagram thereof.

In the press molding, the notches 13a are gradually closed as the core layer 13 is gradually bent, and finally the notches 13a disappear. In addition, the pins 16 are fixed by being held by the frame 14. Further, since the adhesive 12 among the thin plates 11 has not hardened at an initial stage of the press molding, the thin plates 11 are displaced from one another when being bent. Thereafter, the adhesive 12 hardens due to heat from the dies 21 and 22, so that the shape of the core layer 13 is fixed. Thus, even after being removed from the dies 21 and 22, the core layer 13 maintains the shape obtained at the time of the press molding, with good accuracy.

Figure 8:
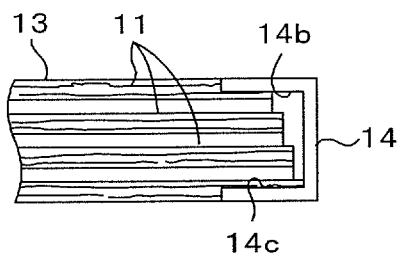
FIG. 8 is a diagram for explaining the method of manufacturing an enclosure according to the first embodiment (No. 8)
Figure 9:
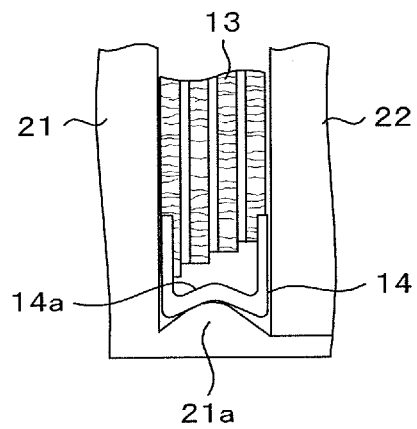
FIG. 9 is a diagram for explaining the method of manufacturing an enclosure according to the first embodiment (No. 9)

Note that end faces of the thin plates 11 are displaced from one another in the end portions of the core layer 13 as in FIG. 8, but the displacement of the thin plates 11 is not be recognized from the outside. This is because the frame 14 is attached to the end portions of the core layer 13.

In addition, at the time of the press molding, the pressure applied from the dies 21 and 22 causes the second surface 14b and the third surface 14c of the frame 14 to bite into the core layer 13, so that the press molded component have smooth end portions. Note that in this embodiment, the lower die 21 is provided with a protrusion 21a in a portion to be brought into contact with the frame 14 as illustrated in a partial cross-sectional diagram of FIG. 9, and thus the first surface 14a of the frame 14 is bent inward.

Figure 10A:
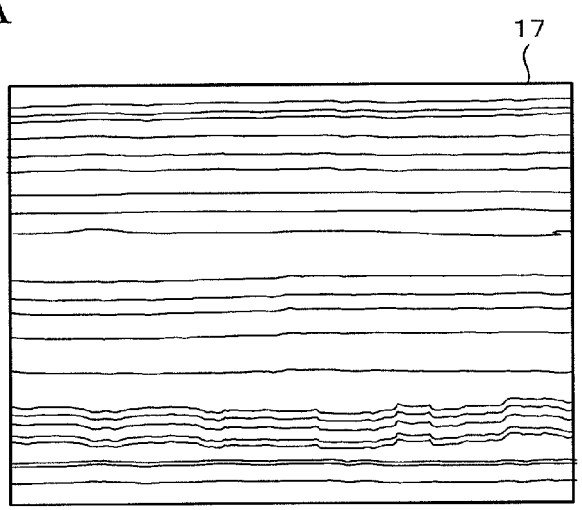
FIGS. 10A and 10B are diagrams for explaining the method of manufacturing an enclosure according to the first embodiment (No. 10)
Figure 10B:
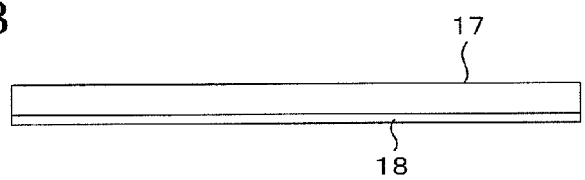

Next, as in a plan diagram of FIG. 10A, a panel 17 having a thickness of approximately 0.5 mm to 1.0 mm, for example, is prepared. Then, a thermosetting adhesive 18 is applied to one of surfaces of the panel 17, as in a cross-sectional diagram of FIG. 10B. A thin plate having an aesthetically pleasing woodgrain pattern is used as the panel 17.

Figure 11:
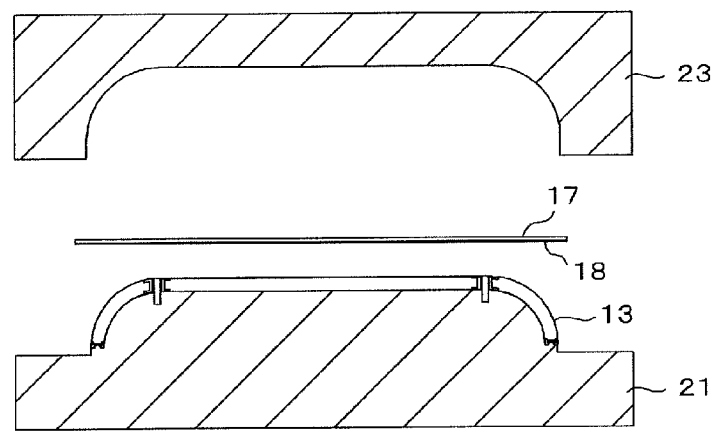
FIG. 11 is a diagram for explaining the method of manufacturing an enclosure according to the first embodiment (No. 11)

Next, the panel 17 is made flexible by being exposed to steam, and then is placed on the core layer 13 in such a manner that the surface to which the adhesive 18 is applied faces downward, as in FIG. 11. Note that reference numeral 23 in FIG. 11 denotes an upper die for press molding a panel.

Figure 12:
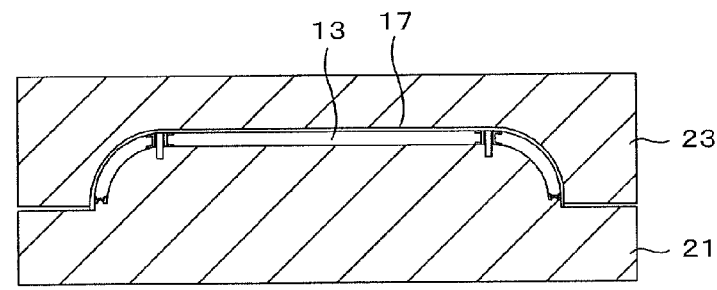
FIG. 12 is a diagram for explaining the method of manufacturing an enclosure according to the first embodiment (No. 12)

Next, as in FIG. 12, the upper die 23 is lowered, so that the lower die 21 and the upper die 23 sandwich the core layer 13 and the panel 17. Then, a pressure and a heat are applied thereto to attach the panel 17 to a surface of the core layer 13, and the adhesive 18 is hardened. Since this embodiment uses the thin plate having the thickness of 0.5 mm to 1.0 mm as the panel 17, the panel 17 is less likely to have a crack or a crease at the time of the press molding.

Figure 13:
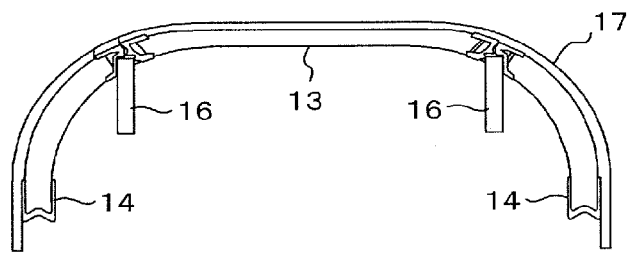
FIG. 13 is a diagram for explaining the method of manufacturing an enclosure according to the first embodiment (No. 13)

Note that when the panel 17 is so thin that the core layer 13 is seen through the panel 17, the two or more panels 17 may be stacked on one another. FIG. 13 is a schematic cross-sectional diagram illustrating a state where the press molded component is removed from the dies 21 and 23. As in FIG. 13, the panel 17 extends downward beyond the frame 14 at the stage after the press molding.

Figure 14:
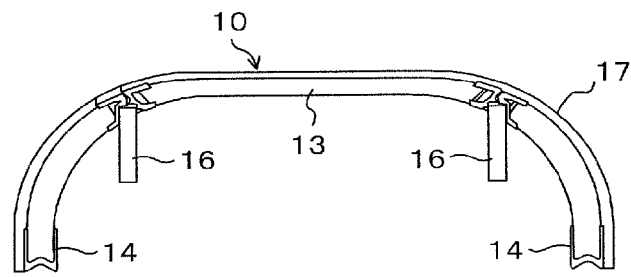
FIG. 14 is a diagram for explaining the method of manufacturing an enclosure according to the first embodiment (No. 14)

Next, as in FIG. 14, the panel 17 is trimmed along the frame 14 by using a cutter, the band saw or the like. The panel 17 is supported by the frame 14 in this embodiment, and thus is less likely to have a defect such as pitching or the like at the time of trimming. In addition, for example, by moving the cutter while being kept in contact with the frame 14, the trimming is always performed at the same position.

Figure 15A:
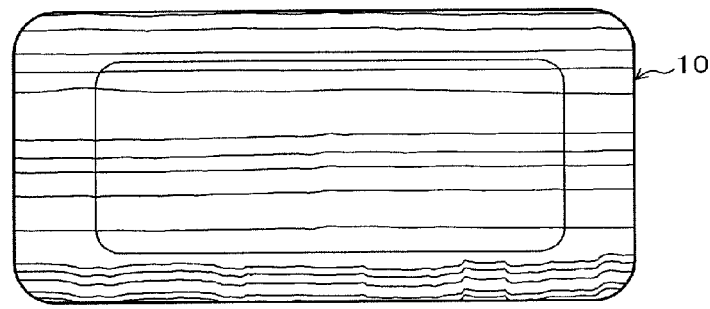
FIGS. 15A to 15C are diagrams for explaining the method of manufacturing an enclosure according to the first embodiment (No. 15)
Figure 15B:
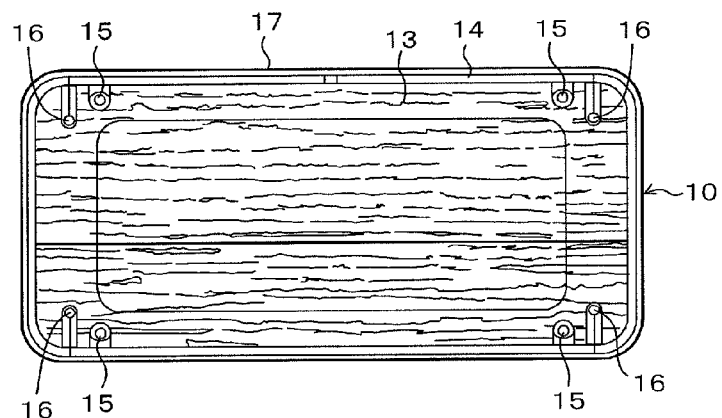
Figure 15C:
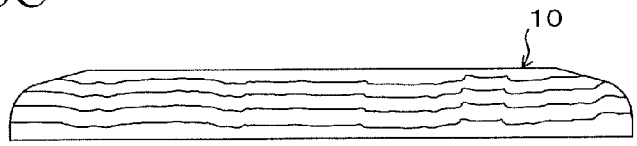

An enclosure 10 according to this embodiment illustrated in FIGS. 15A to 15C is completed in this manner. FIG. 15A is a top diagram of the enclosure 10, FIG. 15B is a bottom diagram thereof, and FIG. 15C is a side diagram thereof. According to this embodiment, the frame 14 is covered with the panel 17, and thus disfigurement of the enclosure 10 due to the frame 14 is prevented.

Figure 16:
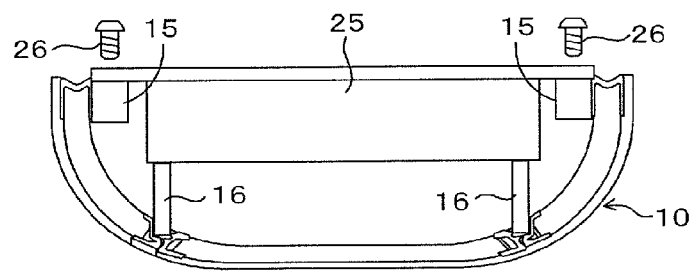
FIG. 16 is a schematic diagram illustrating a state where an electronic component is installed in an enclosure.

FIG. 16 is a schematic diagram illustrating a state where an electronic component 25 is installed in the enclosure 10. As in FIG. 16, the electronic component 25 is fixed onto the bosses 15 by using screws 26 and is supported by the pins 16.

In this embodiment as described above, when being placed on the lower die 21, the core layer 13 is positioned according to the pins 16 and the notches 13a provided in the core layer 13. This leads to good accuracy in positioning the core layer 13 with respect to the dies 21 and 22. By providing the notches 13a, occurrence of a crack or a crease at the press molding is avoided, and thus the core layer 13 may be press molded into the predetermined shape.

Moreover, the adhesive 12 has not hardened at the initial stage of the press molding in this embodiment. Thus, when being bent, the thin plates 11 forming the core layer 13 are displaced from one another, and the core layer 13 easily changes its shape in accordance with the shapes of the dies 21 and 22. Thereafter, the adhesive 12 hardens by being heated due to the heat from the dies 21 and 22. Thereby, even after the core layer 13 is removed from the dies 21 and 22, the shape of the core layer 13 obtained in the press molding is maintained with good accuracy.

Further, since the panel 17 is supported by the frame 14 attached to the end portions of the core layer 13 in this embodiment, a defect such as chipping is less likely to occur when the panel 17 is trimmed for eliminating unnecessary portions.

Still further, the bosses 15 are integrally formed with the frame 14 in this embodiment, and thus do not have to be separately formed and attached to the enclosure 10. This may reduce the number of steps. Yet further, since the panel 17 without notches is bonded to the core layer 13 in this embodiment, the enclosure 10 has a continuous woodgrain pattern on the surface thereof, and the texture of wood is not impaired.

Hereinbelow, in comparison with Comparative Example, a description is given of yield results obtained by actually manufacturing enclosures by the method of manufacturing an enclosure according the aforementioned embodiment.

EXAMPLE

Firstly, the thin plates 11 formed from thinnings and each having a thickness of 0.5 mm are prepared as a material of the core layer 13. Then, a thermosetting adhesive is applied to the thin plates 11 by using a squeeze, and then the thin plates 11 are stacked to form four layers with their woodgrain patterns crossing each other layer by layer, so that the core layer 13 is formed.

Next, the core layer 13 is punched by using a punch press to have the shape illustrated in FIG. 2. Thereafter, the frame 14 is attached to the end portions of the core layer 13 (see FIG. 4). The frame 14 is made of resin, and is provided with the cylindrical bosses 15 at predetermined positions.

Next, the core layer 13 is made flexible by being exposed to high-temperature steam for about 30 seconds. Thereafter, the core layer 13 is placed on the lower die 21 of the pressing machine. At this time, as in FIGS. 5A and 5B, the position of the core layer 13 is determined by using the pins 16 as guides.

Next, the core layer 13 is sandwiched between the lower die 21 and the upper die 22, and is left for five minutes while a heat and a pressure are applied thereto. At this time, the temperatures of the lower die 21 and the upper die 22 are 140° C. and 130° C., respectively, and the applied pressure is 90 MPa.

Next, the two panels 17 each having a thickness of 0.5 mm are prepared. The thermosetting adhesive is applied to the panels 17, and the panels 17 are bonded together with the woodgrain patterns thereof aligned with each other. Then, the panel 17 thus formed into one is made flexible by being exposed to high-temperature steam for about 30 seconds, and is layered onto the core layer 13 by using the pressing machine.

Press molded components are obtained in this manner, and the sizes (dimensions) of each press molded component are 30 cm in length, 45 cm in width, and about 3 cm in height. A curvature radius of each corner portion is 3 cm. Among the 50 press molded components manufactured until this step, the number of defectives is 2, and thus the yield is 96%.

Next, each press molded component is cut horizontally by using the band saw so that each enclosure 10 has a height of 25 mm. At this time, the press molded component is cut along the frame 14. As the result, among the 40 press molded components, the number of press molded components having pitching is 0, and the number of press molded components having distortion (the height changes by 2 mm or more within the same plane) is 1. In other words, the yield in the step of trimming the panel 17 is 97.5%.

Comparative Example

As in Example, thin plates having the thickness of 0.5 mm are stacked on one another to have four layers, so that a core layer is formed. Then, the core layer is made flexible by being exposed to high-temperature steam for about 30 seconds, and then is press molded by using the pressing machine. However, unlike Example, no notches are provided in the core layer and no frame is attached to the core layer in Comparative Example. The press molding is performed under the same condition as in Example.

Next, two panels each having a thickness of 0.5 mm are prepared. The thermosetting adhesive is applied to the panels, and the panels are bonded together with their woodgrain patterns aligned with each other. Then, the panel thus formed into one is made flexible by being exposed to high-temperature steam for about 30 seconds, and is layered onto the core layer by using the pressing machine.

Press molded components are obtained in this manner, and the sizes (dimensions) of each press molded component are 30 cm in length, 45 cm in width, and about 3 cm in height. A curvature radius of each corner portion is 3 cm. Among the 50 press molded components manufactured until this step, the number of defectives is 29, and thus the yield is 42%. Specifically, the number of the defectives (having at least one crack) resulting from the press molding of the core layer is 25, and the number of the defectives resulting from the bonding of the panel is 4.

Next, each press molded component is cut horizontally by using the band saw so that each enclosure has a height of 25 mm. In this case, among the 20 press molded components, the number of press molded components having pitching is 9, and the number of press molded components having distortion (the height changes by 2 mm or more within the same plane) is 1. The yield in the step of trimming the panel is 50%.

From Example and Comparative Example described above, it is confirmed that this embodiment is useful.

[Second Embodiment]

Figure 17A:
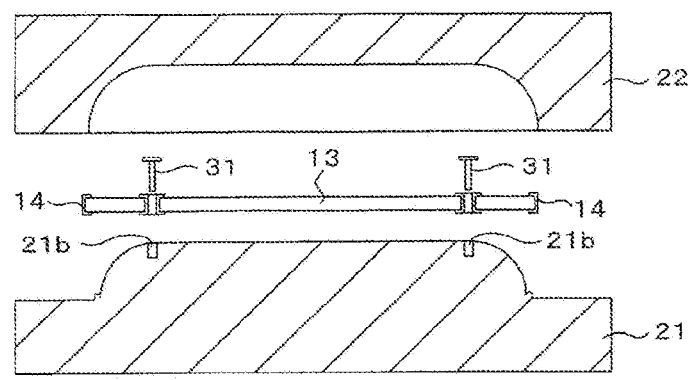
FIGS. 17A and 17B are diagrams for explaining a method of manufacturing an enclosure according to a second embodiment.
Figure 17B:
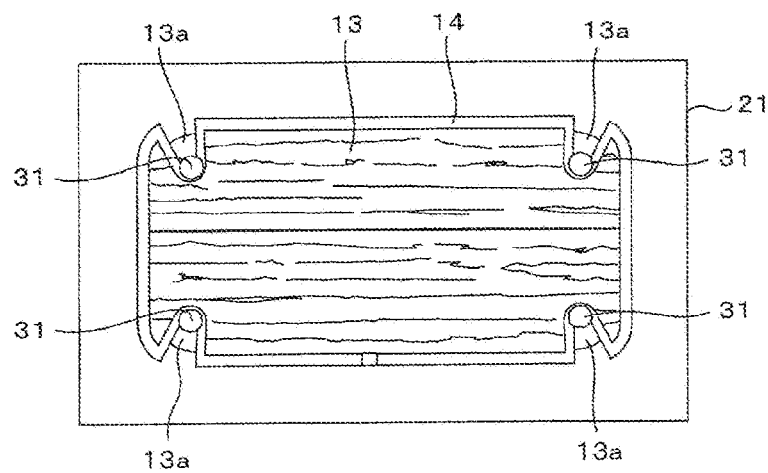

FIGS. 17A and 17B are diagrams for explaining a method of manufacturing an enclosure according to a second embodiment. Note that difference between this embodiment and the first embodiment lies in that pins used for press molding the core layer 13 have a different shape, and the other components have basically the same configuration as that in the first embodiment. Hence, duplicate descriptions of the same components are omitted here.

Figure 5B:
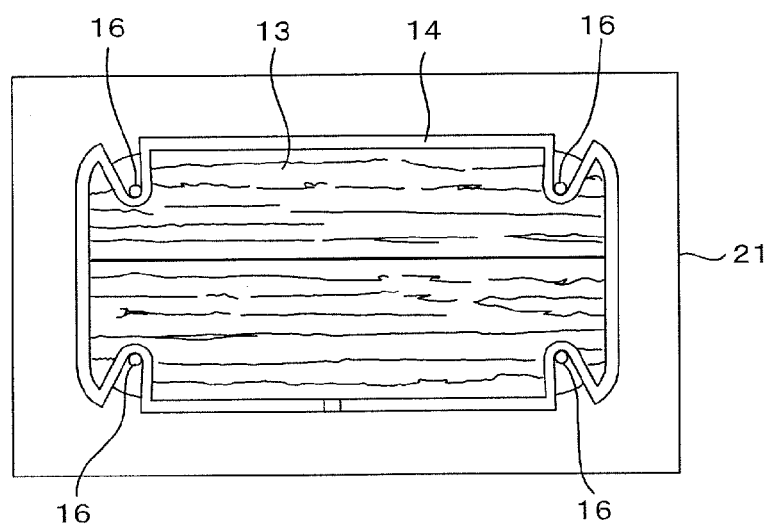

In the first embodiment, before the core layer 13 is press molded, the pins 16 are inserted into the holes provided in the corner portions of the lower die 21, and the core layer 13 is placed on the lower die 21 by using the pins 16 as the guides (see FIGS. 5A and 5B). In contrast in the second embodiment, nail-shaped pins 31 each having a disc-shaped top are used as in FIG. 17A. As in FIG. 17B, the pins 31 are respectively placed in the notches 13a of the core layer 13 to which the frame 14 is attached, and the core layer 13 is placed on the lower die 21 in such a manner that tip ends of the pins 31 are inserted in holes 21b provided in the corner portions of the lower die 21. This may make it possible to accurately position and place the core layer 13 on the lower die 21.

Figure 18:
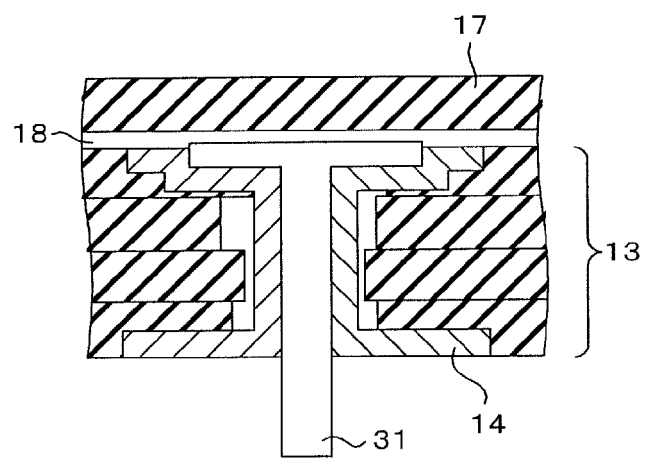
FIG. 18 is a diagram illustrating a state after the panel is bonded to a core layer.

The top of each pin 31 bites into the core layer 13 when the core layer 13 is press molded. This makes a surface of a press molded component flat. Accordingly, as in FIG. 18, even after the panel 17 is bonded to the core layer 13 with the adhesive 18, the panel 17 has a flat surface. This embodiment also provides the same advantageous effects as in the first embodiment.

[Third Embodiment]

FIGS. 19 to 26C are diagrams for explaining a method of manufacturing an enclosure according to a third embodiment.

Figure 19:
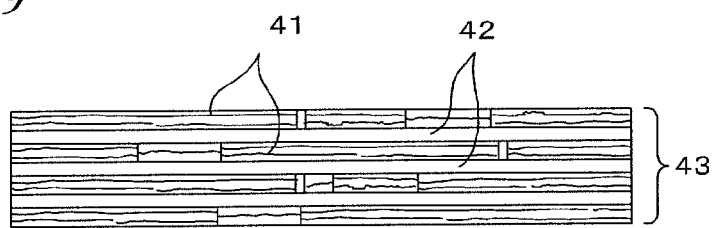
FIG. 19 is a diagram for explaining a method of manufacturing an enclosure according to a third embodiment (No. 1)

Firstly, as in a cross-sectional diagram of FIG. 19, a plurality of thin wooden plates 41 are bonded together by using a thermosetting adhesive 42 to form a core layer 43. At this time, the thin plates 41 are bonded together by using adhesive force of the thermosetting adhesive 42 before hardening, and thus the thermosetting adhesive 42 is not hardened.

Figure 20:
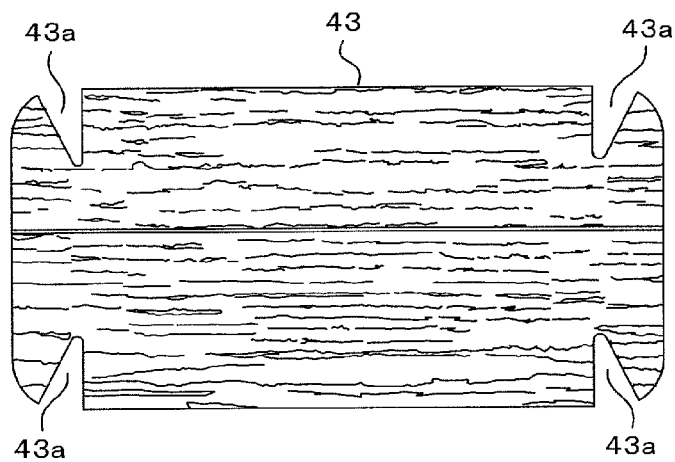
FIG. 20 is a diagram for explaining the method of manufacturing an enclosure according to the third embodiment (No. 2)

Next, as in a plan diagram of FIG. 20, the core layer 43 is cut into a predetermined shape. At this time, notches 43a are provided in portions to be largely bent in press molding to be described later. It is important that the notches 43a disappear by being closed at the time of the press molding. Portions for the notches 43a are determined in accordance with the shape to be obtained after the press molding.

Figure 21A:
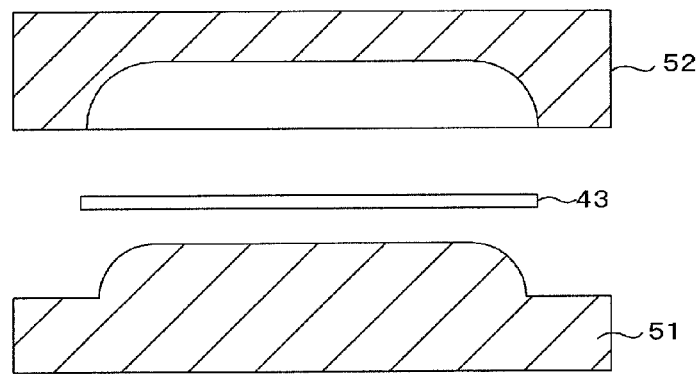
FIGS. 21A and 21B are diagrams for explaining the method of manufacturing an enclosure according to the third embodiment (No. 3)
Figure 21B:
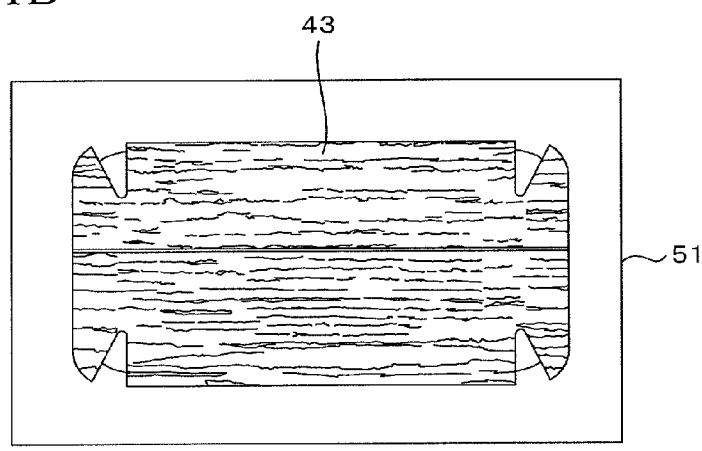

Next, as in a cross-sectional diagram of FIG. 21A and a plan diagram of FIG. 21B, the core layer 43 is placed at a predetermined position on a lower die 51 of the pressing machine. Note that reference numeral 52 in FIG. 21A denotes an upper die for press molding a core layer.

Figure 22:
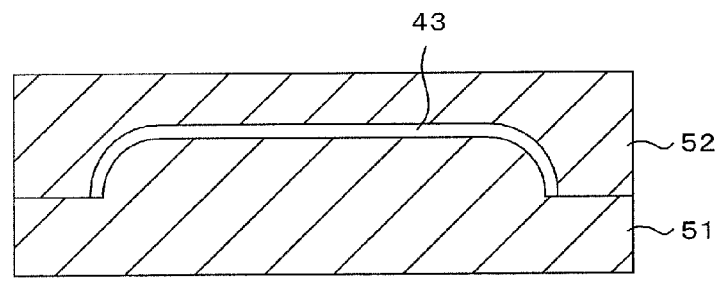
FIG. 22 is a diagram for explaining the method of manufacturing an enclosure according to the third embodiment (No. 4)

Next, as in FIG. 22, the upper die 52 is lowered, so that the lower die 51 and the upper die 52 sandwich the core layer 43. Then, a pressure and a heat are applied thereto to press mold the core layer 43 into a predetermined shape corresponding to the dies 51 and 52.

In the press molding, the notches 43a are gradually closed as the core layer 13 is gradually bent, and finally the notches 43a disappear. Since the adhesive 42 among the thin plates 41 has not hardened at the initial stage of the press molding, the thin plates 41 are displaced from one another when being bent. Thereafter, the adhesive 42 hardens due to heat from the dies 51 and 52, so that the shape of the core layer 43 is fixed. Thus, even after being removed from the dies 51 and 52, the core layer 43 maintains the shape obtained in the press molding, with good accuracy.

Figure 23:
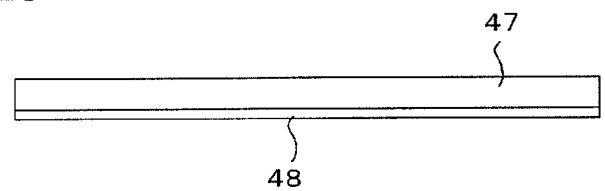
FIG. 23 is a diagram for explaining the method of manufacturing an enclosure according to the third embodiment (No. 5)

Next, as in in FIG. 23, a panel (a thin plate having an aesthetically pleasing woodgrain pattern) 47 having a thickness of approximately 0.5 mm to 1.0 mm, for example, is prepared. Then, a thermosetting adhesive 48 is applied to one of surfaces of the panel 47.

Figure 24:
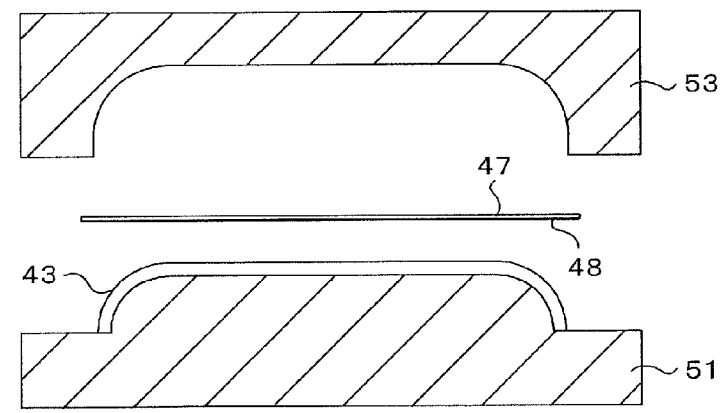
FIG. 24 is a diagram for explaining the method of manufacturing an enclosure according to the third embodiment (No. 6)

Next, the panel 47 is made flexible by being exposed to high-temperature steam, and then is placed on the core layer 43 in such a manner that the surface to which the adhesive 48 is applied faces downward, as in FIG. 24. Note that reference numeral 53 in FIG. 24 denotes an upper die for press molding a panel.

Figure 25:
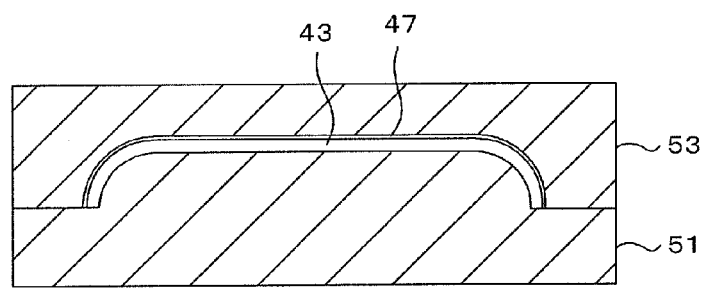
FIG. 25 is a diagram for explaining the method of manufacturing an enclosure according to the third embodiment (No. 7)

Next, as in FIG. 25, the upper die 53 is lowered, so that the lower die 51 and the upper die 53 sandwich the core layer 43 and the panel 47. Then, a pressure and a heat are applied thereto to bond the panel 47 to a surface of the core layer 43, and the adhesive 48 is hardened.

Figure 26A:
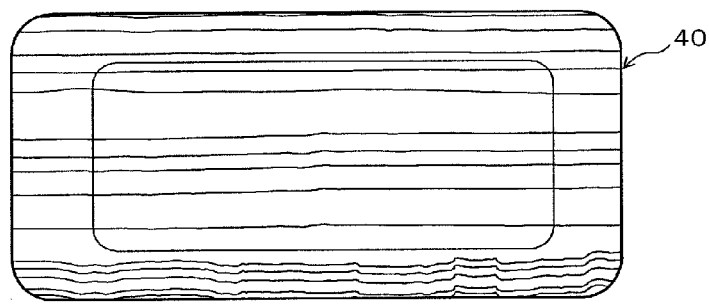
FIGS. 26A to 26C are diagrams for explaining the method of manufacturing an enclosure according to the third embodiment (No. 8).
Figure 26B:
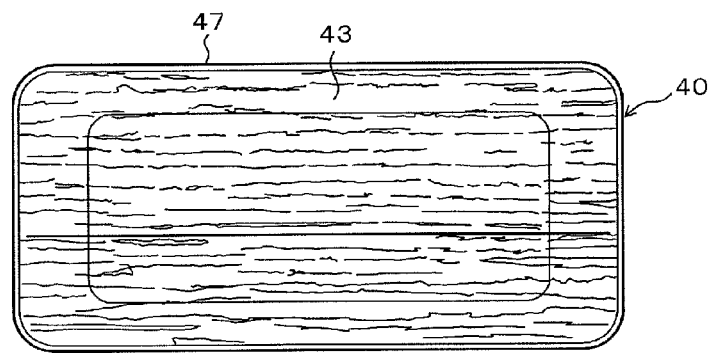
Figure 26C:
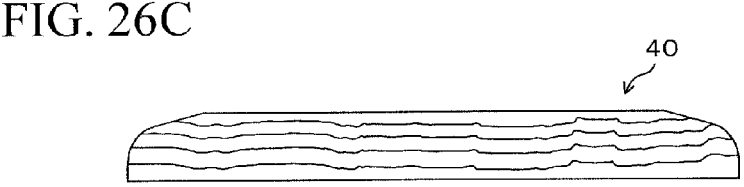

Then, a press molded component is removed from the dies 51 and 53, and lower portions (unnecessary portions) of the press molded component are trimmed by using the cutter or the band saw. Thereby, an enclosure 40 as illustrated in FIGS. 26A to 26C is completed. FIG. 26A is a top diagram of the enclosure 40, FIG. 26B is a bottom diagram thereof, and FIG. 26C is a side diagram thereof.

The lower die 21 and the core layer 13 are positioned by using the pins 16 (see FIGS. 5A and 5B) in the first embodiment, while no pin is used in this embodiment. Hence, it is important that the core layer 43 be positioned with respect to the lower die 51 with good accuracy when being press molded. However, the core layer 43 is provided with the notches 43a in this embodiment. Thus, if the core layer 43 is positioned with respect to the lower die 51 with good accuracy, occurrence of a crack or a crease as in the first embodiment may be avoided. Moreover, since the panel 47 without notches is bonded to the core layer 43 also in this embodiment, the enclosure 40 has a continuous woodgrain pattern on the surface thereof, and the texture of wood is not impaired.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A method of manufacturing an enclosure, the method comprising:
    forming a core layer by bonding a plurality of wooden plates together by using an adhesive;
    cutting the core layer to have a shape having a notch;
    placing the core layer on a die of a pressing machine while positioning the core layer by using the notch and a pin placed on the die; and
    press molding the core layer to firmly hold the pin by an outer edge of the notch and to harden the adhesive.

2. The method of manufacturing an enclosure according to claim 1, the method further comprising:
    attaching a frame to end portions of the core layer between the cutting the core layer and the placing the core layer, wherein
    the pin is held and fixed by the frame in the press molding the core layer.

3. The method of manufacturing an enclosure according to claim 2, wherein the frame is provided with a boss for screwing.

4. The method of manufacturing an enclosure according to claim 2, wherein a strength of the frame is higher than a strength of the core layer.

5. The method of manufacturing an enclosure according to claim 2, the method further comprising:
    bonding a panel to the core layer molded by the press molding, after the press molding the core layer.

6. The method of manufacturing an enclosure according to claim 1, the method further comprising:
    making the core layer flexible by exposing the core layer to steam, between the cutting the core layer and the placing the core layer.

7. The method of manufacturing an enclosure according to claim 5, the method further comprising:
    trimming the panel along the frame.

8. The method of manufacturing an enclosure according to claim 1, wherein the wooden plates to form the core layer are impregnated with a flame retardant.

9. The method of manufacturing an enclosure according to claim 2, wherein the die is provided with a protrusion for bending a surface of the frame inward, the surface facing an end face of the core layer.

10. The method of manufacturing an enclosure according to claim 1, wherein the pin has a disc-shaped head portion.

11. The method of manufacturing an enclosure according to claim 1, wherein the wooden plates to form the core layer have a thickness of 0.5 mm to 1.0 mm.

* * * * *